May 6, 1941.  A. CAMPBELL  2,240,687
DUMP CAR DOOR CONSTRUCTION
Filed July 17, 1939   5 Sheets-Sheet 1

INVENTOR.
Argyle Campbell
BY
George D. Haight
ATTORNEY.

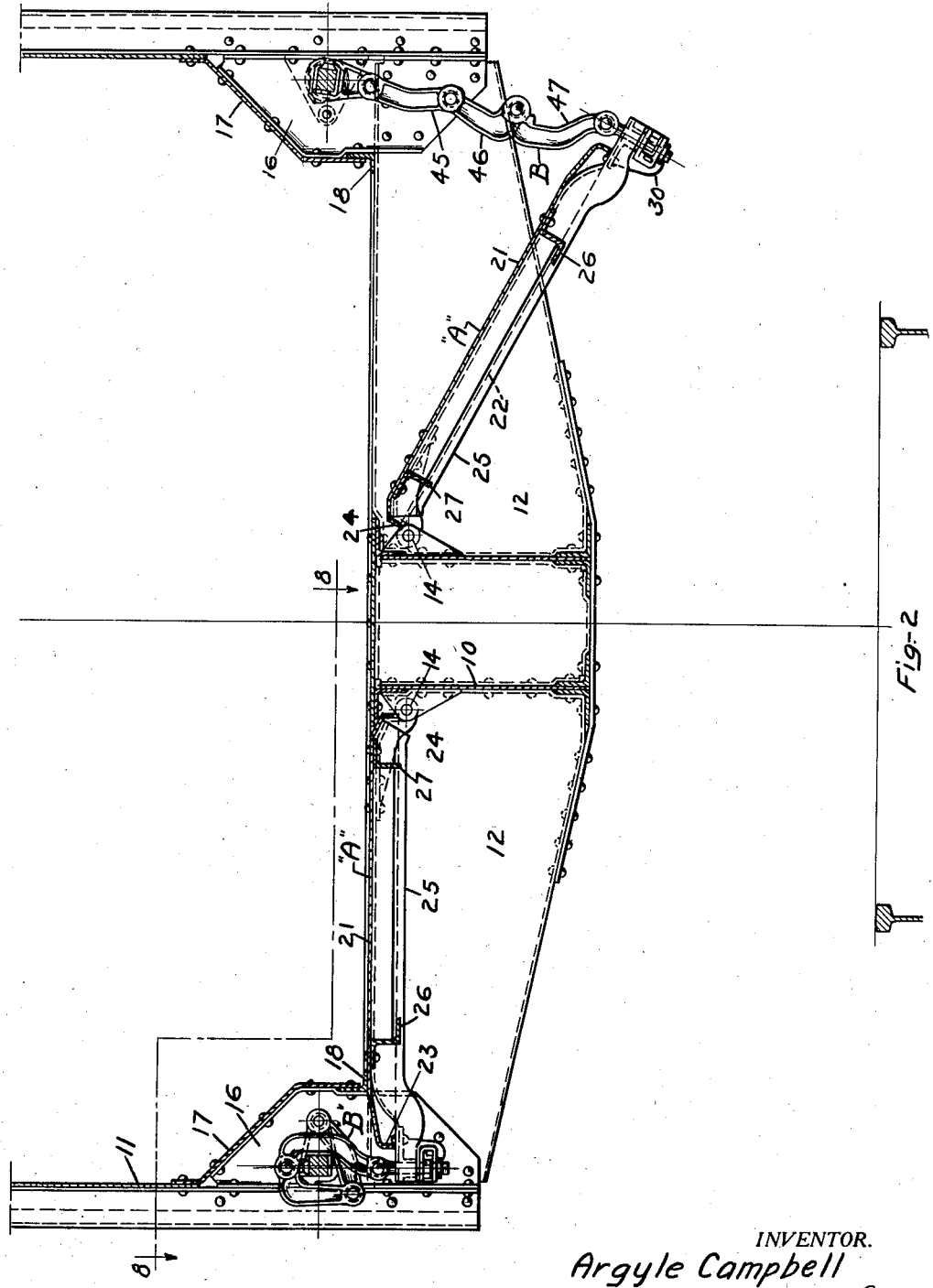

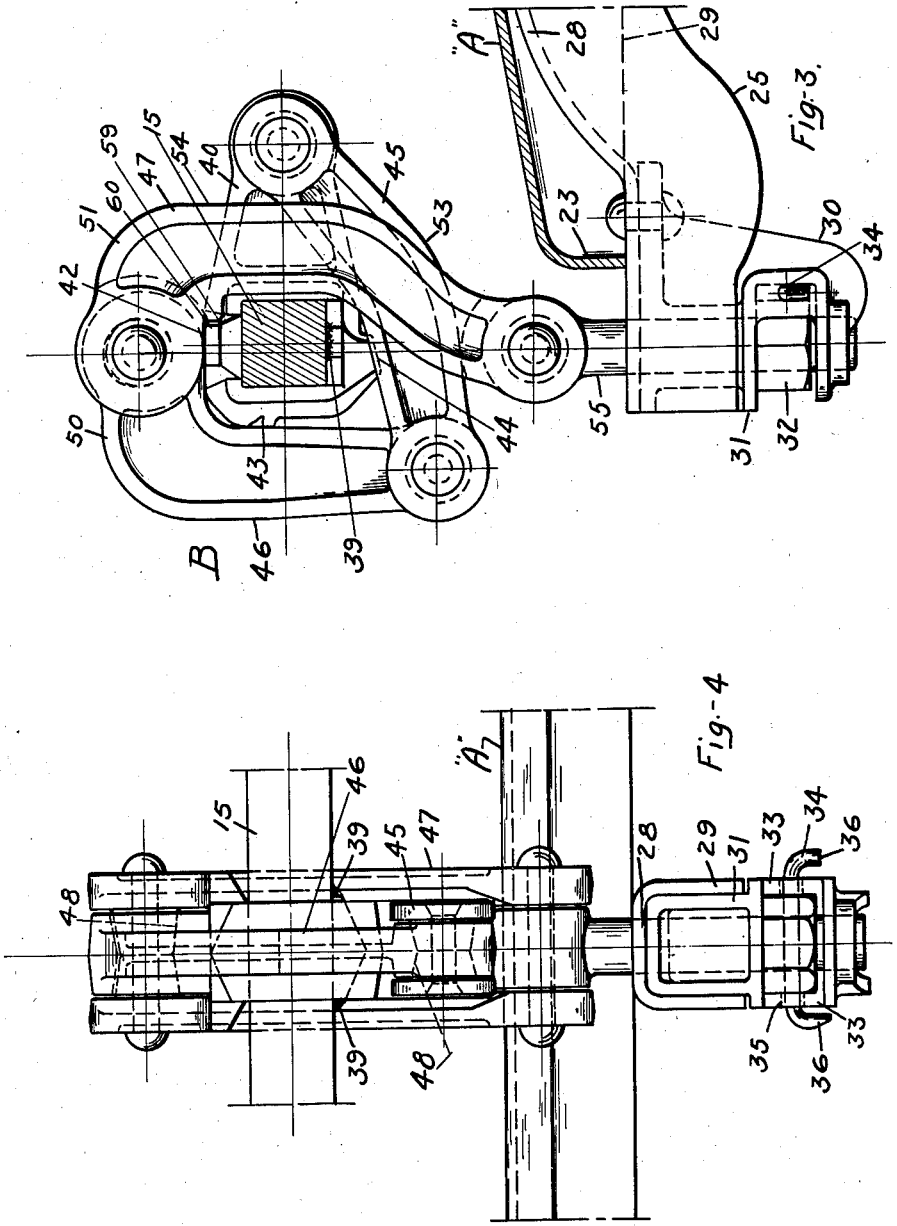

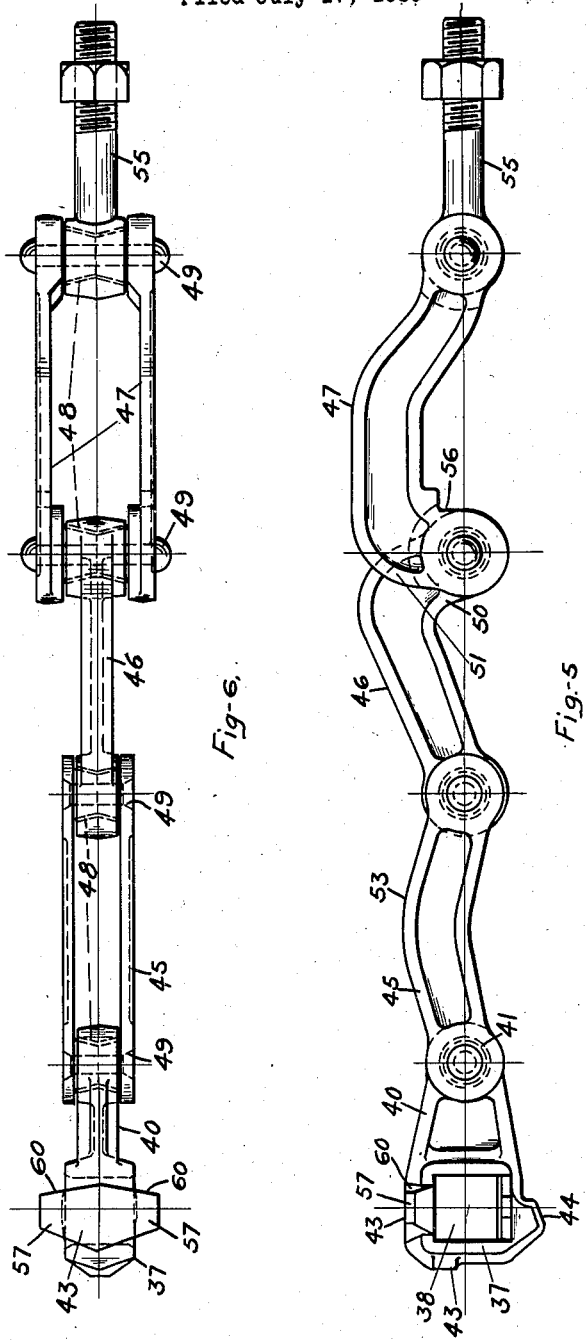

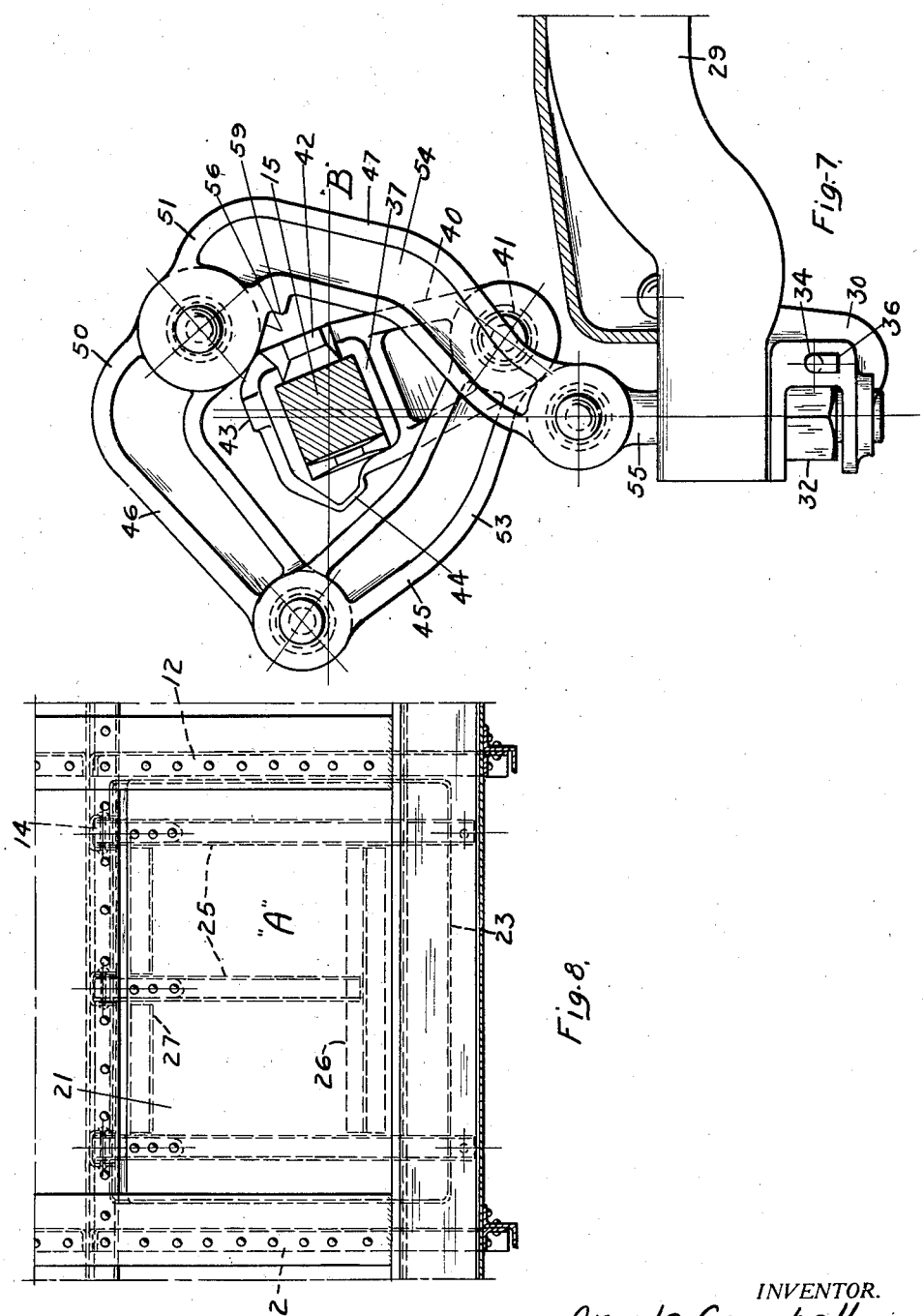

Patented May 6, 1941

2,240,687

UNITED STATES PATENT OFFICE 2,240,687

DUMP CAR DOOR CONSTRUCTION

Argyle Campbell, Chicago, Ill., assignor to Enterprise Railway Equipment Company, Chicago, Ill., a corporation of Illinois Application July 17, 1939, Serial No. 284,863

5 Claims. (Cl. 105—290)

My invention relates to improvement in railway dump car door mechanism.

A primary object of the invention is the provision of a dump car door lifting, locking and door-supporting mechanism of the winding type, composed of a relatively few flexibly assembled parts occupying a small space and in combination providing for a generous movement of a car door from the open to closed position.

Another object of the invention is to provide a mechanism which operates from its open to closed or closed to open positions, moving at all times in a single plane.

A further object of the invention is to provide adjustability of each part in relation to the adjacent part and adjustability of the combined mechanism parts with relation to the car door.

Another and further object of the invention is to provide for an orderly consecutive interengagement of parts for pressing forward the adjacent part in an opening direction after initiating an opening movement of the first part and should the car door be frozen closed for applying a blow or pressure by the mechanism itself against the car door in an opening direction.

For accomplishing the above objects I conceive a combination of inter-locking link parts which may be conveniently formed, assembled and applied to a rotatable shaft at one end and to the car door at the other.

Herewith follows a clear description of my invention with the accompanying drawings wherein:

Fig. 2 is an enlarged transverse vertical sectional view taken on a line 2—2 of Fig. 1, the right-hand half of the figure illustrating the door in open position, and the left-hand half of the figure showing the door in closed position;

Fig. 3 is an enlarged detail view of the door-operating mechanism shown in the left-hand half of Fig. 2;

Fig. 4 is an elevational side view at right angle of the structure shown in Fig. 3;

Fig. 5 is an enlarged detail view of the linkage mechanism extended as shown in the right-hand half of Fig. 2 when the door is in open position;

Fig. 6 is a side view at right angle of the mechanism shown in Fig. 5;

Fig. 7 is a vertical, elevational, transverse sectional view of part of the door and mechanism showing the position of the parts when the mechanism is called upon to initiate downward movement of a frozen door; and Fig. 8 is a plan view taken from the line 8—8 of Fig. 2, illustrating one of the doors in closed position, and the adjacent frame structure related thereto.

Figure 1:
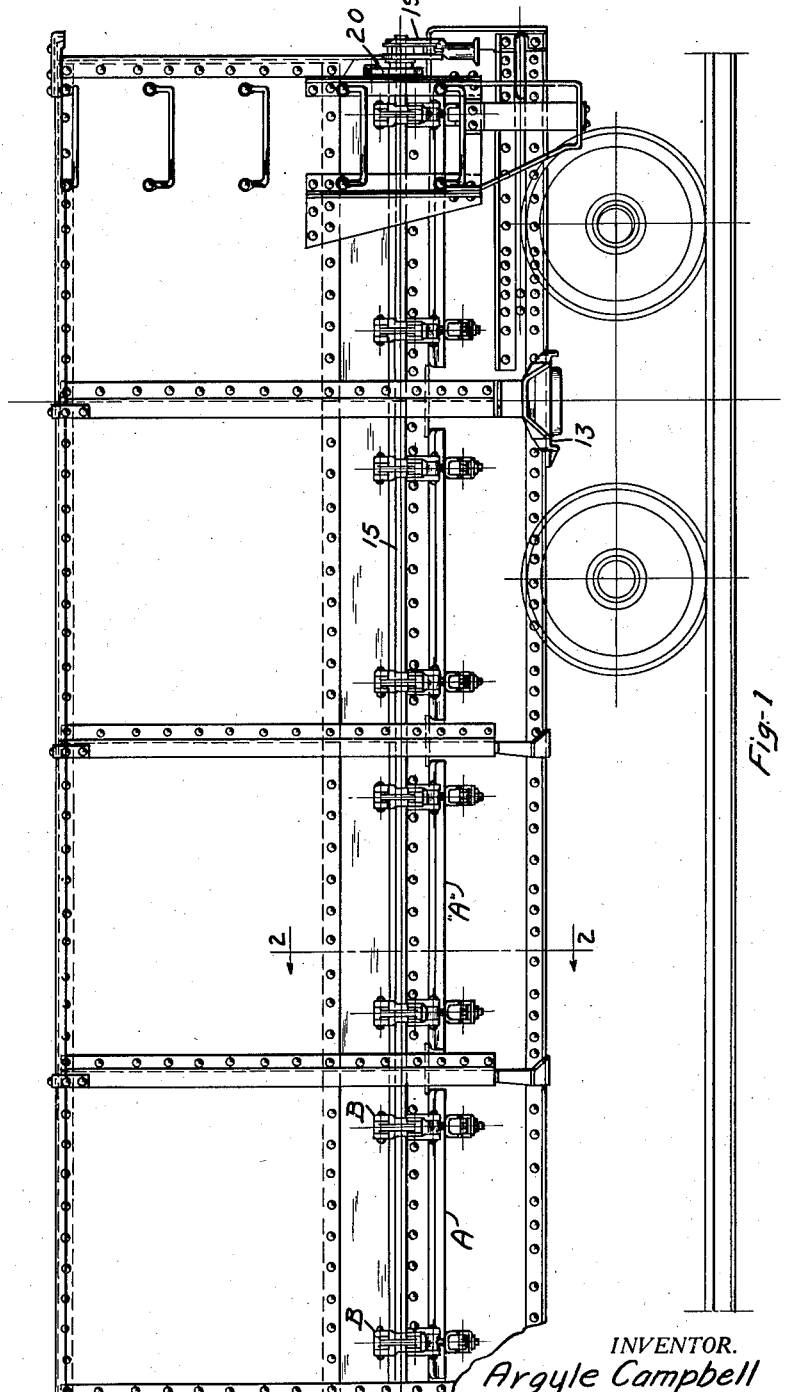
Fig. 1 is a vertical side elevational view of a portion of a car showing my improved construction as applied to a so-called general service type of car, wherein substantially horizontally disposed doors are used for the purpose of presenting a substantially flat floor car.

In said drawings, the car-framing structure is shown as including a longitudinal center sill formed of a box-shaped girder 10, side walls 11, and cross members connecting the side walls and center sills as indicated by crossbeams 12 and body bolsters 13. The cross members are spaced lengthwise of the car from each other, and dumping doors A are disposed in the intervening spaces. The doors are hingedly mounted at their inner ends on the center sill at 14 and are supported adjacent the side wall of the car by door winding, locking and supporting mechanisms B. The door-operating mechanisms B, of which there are preferably two per door, are supported on winding shafts 15 which are usually formed square in section. Each winding shaft is rotatably supported in gussets 16 and the car side walls are provided with lower sloping portions 17 above the shafts and mechanisms, said sloping portions being extended downwardly to meet with the doors and there reinforced by angle members 18.

The winding shafts usually extend lengthwise from the center of the car towards the ends and are there provided with suitable lever and ratchet means, as indicated conventionally at 19, for the purpose of rotating the shaft, and in order to lock the shaft against unwinding rotation a locking pawl and ratchet 20 is also provided.

Each door A is preferably formed of a flat plate 21 bent at its margins as at 22, 23, and 24, to provide a pan-shaped structure. The door on its underside is reinforced by hinge beams 25 and front and rear beams as indicated at 26 and 27 respectively, said respective beams being preferably welded to the underside of the door plate.

The hinge beams 25, which are disposed in alignment with the door mechanisms B, preferably consist of inverted U or channel shaped members including a flat body portion 28 adapted to underlie the door plate and depending side portions 29. Each beam 25 is extended outwardly beyond the free edge of the door and is there provided with a bracket member 30 which is disposed within the U-shaped beam, at the end thereof, and suitably secured thereto, either by welding or riveting or by a combination of welding and riveting. The bracket 30 is provided with a housing portion 31 within which a threaded nut 32 is adapted to be housed. The housing portion includes side walls 33 disposed outwardly on each side of the nut a sufficient distance to permit the nut to freely turn in its housing. In order to restrain the nut against unwarranted turning a locking pin 34 is extended through openings 35 formed in the walls 33 and is so located as to extend immediately adjacent a side face of the nut and block turning movement thereof. The pin 34 is retained in place by bending its end portions 36.

The door operating link mechanisms B, being all of similar construction, the description herein will be confined to only one of such mechanisms. Each mechanism includes a hub portion formed of a substantially rectangular collar 37 having an opening 38 (Fig. 5) corresponding in shape to the shape of the shaft 15 and through which the shaft extends. The said hub portion is retained on the shaft against lengthwise movement by welding, as indicated at 39, or other suitable means.

Extending outwardly from one side of the hub is an arm 40 which is provided at an appreciable distance from the axis of the shaft with a circular opening 41. The hub is provided on its other three sides with link bearing faces as indicated at 42, 43, and 44, respectively. The pivoted link system of the mechanism is made up of three link sections, as indicated at 45, 46, and 47, respectively. The section 46 is of single web formation and is disposed substantially in the same plane of rotation as the arm 40 of the hub, whereas the sections 45 and 47 are each formed of double walls between which the intermediate link 46 is sandwiched. The double wall elements are each formed with circular lugs 48 which constitute the pivots around which the links flex and said lugs also operate to maintain the double walls of links 45 and 47 in spaced relation. Rivets 49 extend through the lugs for the purpose of maintaining the parts in place.

The intermediate link 46 and the terminal end link section 47 are each formed with an upper hook-shaped portion indicated at 50 and 51 respectively, said hook portions of the links being pivotally united slightly off center but closely in alignment with and above the axis of the shaft 15 when the links are wound around said shaft. Thus the intermediate link 46 is of L-shape formation with the short arm forming the hook-shaped portion 50 resting on the hub and the long arm forming the shank and adapted to contact face 43 of the hub, the said long arm extending downwardly below the hub and being pivotally united with the end link section 45.

The pair of wall elements forming the end link section 45 extend beneath the hub and are bent as at 53 to extend around two sides of the hub. They are pivotally connected at their ends with the arm 40 of the hub through the medium of opening 41. The link elements of said links 45 are adapted to contact face 44 of the hub while the link system is wound around the shaft hub.

The pair of hook-shaped link elements which constitute the terminal link section 47 have their longer or shank portions extending downwardly from the hook portions 51, and said shank portions are deflected downwardly around and beneath the shaft to pivotally connect with threaded eyebolt 55 at a location in vertical alignment with the connecting center of hooked portions 50 and 51 of members 46 and 47 respectively. Said threaded eyebolt is adjustable vertically by the nut 32 and said adjustment is obtained by turning the nut, it being understood that the lugs 48 of link section 47 extend through the eyebolt and maintain the bolt against turning. The pair of terminal link elements or members are spaced from each other so that their shank portions lie on each side of the arm 40 and straddle the end link section 45 when the mechanism is in closed position. The fact that the hub arm 40 and link 45 pass between the pair of spaced link members of link section 47 permits the shank portions of link section 47 to lie immediately adjacent the shaft when the doors are closed.

The upper hook-shaped portions 51 of the terminal link section 47 are formed on their inner side with seats 56 which are adapted to rest on seats 57 which are formed by laterally extending portions of the hub constituting continuations of seat 42. These seat extensions are preferably in the form of upwardly tapering bracket portions.

In the shoulder presented at the junction of the hook-shaped portion 51 and the shank portion 54, the terminal link elements are provided with gusset-like portions which form shoulders 59. These shoulders are adapted to be engaged by the adjacent vertical edges of seat extensions 57 and thereby effectively push the linkage to an unlocked or open position.

Under extreme cold weather conditions there is a tendency for lading to freeze in the car and for the doors to adhere to the frozen load. Under such conditions the rotation of the shaft in the door opening direction leads to the links heretofore used becoming fouled with each other so as to become inoperative and wedge against the car side. This is impossible with my mechanism as shown and claimed, as under such circumstances as a door held closed by a frozen load, if the shaft is rotated in the direction for unlocking the mechanism and the door does not drop by its own weight the mechanism can only move a short distance before the arm 40 of the hub and the links 45 hit the eyebolt 55 and cannot pass beyond it; therefore the link parts 45, 46, and 47 cannot move to a position where the joints would be broken in the wrong direction and cause the parts to entangle and become fouled against the sloping car side, but instead when my mechanism has been rotated to the position where the hub arm 40 and links 45 hit the eyebolt 55 my link parts remain in good position and a pressure or blow delivered by rotation of the shaft will usually break the contact between the door and the frozen load. It will be appreciated that considerable force may at times be necessary to release the frozen doors in the manner described, but as said doors are usually operated in multiples of three or four doors from a common shaft, it will be understood that if one door of a series opens, the weight of the load on said door is then available to assist in rotating the shaft and releasing companion doors.

While I have herein shown and described what I consider the preferred embodiments of my invention, I now contemplate such changes as might fairly fall within the scope of the appended claims.

I claim:

1. In a dump car, in combination with a dump door and an operating shaft above the door, door winding, locking and supporting mechanism connecting the shaft and door and including a hub member rigidly mounted on the shaft, and self-locking linkage mechanism adapted to wind on the hub, said linkage mechanism including three link sections flexibly united to wind around the hub and present two of the link sections in straddling relation with respect to the shaft, said straddling link sections being L-shaped and being pivotally united above the shaft at a point off center of a vertical line through the axis of the shaft, one of said straddling link sections extending downwardly in straddling relation to the third link section and connected below the shaft to the door at a point in a vertical line extending through the point of connection of the two straddling link sections before named.

2. In a dump car door mechanism, the combination with a dumping door and an operating shaft above the door, self-locking linkage mechanism connecting the shaft and door and including a polygonal-shaped hub rigidly mounted on the shaft, three pivotally connected link sections adapted to wind around the hub, and each link section being formed to embrace two sides of the hub and the end link being connected to said door, and means actuated by said shaft adapted in its initial movement to engage the door in closed position and force the door in an opening direction should the door be held closed by freezing.

3. In a dump car, having horizontal doors hinged longitudinally of the car to the center sills and having their free edges extending along the bottom of a vertical side wall having its vertical side sloping inwardly and downwardly along its bottom position; the combination of a longitudinal shaft located below and outside of the inclined portion of the car wall, a hub casting having an arm thereon and a hole therein on the shaft, an eyebolt in the door having a hole therein, three connecting links between the hub arm and the eyebolt for lifting, locking and supporting the car door in closed position and means on the shaft for turning the same; the said arm on the hub and the said eyebolt in the door being in engageable position when the arm is actuated to release the door whereby a direct force may be transmitted from the hub arm to the eyebolt for forcing the door open if frozen in a closed position.

4. In a dump car, having horizontal doors hinged to the center sill, a car side vertically disposed for its major portion but having its lower portion inclined inwardly and downwardly, a shaft extending longitudinally of the car and located below and outside of the said inwardly and downwardly inclined portion of the car side, means for rotating the said shaft; a hub on said shaft having an arm and an eyebolt in said door, three flexible link elements interposed between the hub arm and door eyebolt completing a winding mechanism for lifting, locking and supporting the car door in closed position, the said hub arm and eyebolt being in engageable proximity to each other whereby such engagement stops rotation of the shaft and prevents the three link elements from doubling over and fouling against the offset car side.

5. In a dump car, the combination with a dump door, and an operating shaft above the door; an eyebolt mounted on the door; self-locking winding linkage mechanism including a hub rigidly mounted on the shaft and having an arm outstanding from one side thereof, and a plurality of winding faces; a series of winding links connected at one end to the arm and having a terminal link at its opposite end connected to said eyebolt and adapted to wind around the faces of the hub, said terminal link comprising two hook-shaped link members spaced from each other lengthwise of the shaft and lying on opposite sides of the arm when said linkage is wound around said shaft, said arm of the hub being adapted to contact the eyebolt after a predetermined rotary movement of the shaft whereby a blow is applied to the door in an opening direction should the door be frozen shut when the linkage mechanism has begun to operate.

ARGYLE CAMPBELL.